(12) United States Patent
Kulovits et al.

(10) Patent No.: US 6,983,897 B2
(45) Date of Patent: Jan. 10, 2006

(54) FUEL INJECTION VALVE FOR INTERNAL COMBUSTION ENGINES, AND A METHOD FOR PRODUCING SAME

(75) Inventors: Walter Kulovits, Leutkirch (DE); Juergen Gottschling, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 09/937,309

(22) PCT Filed: Dec. 22, 2000

(86) PCT No.: PCT/DE00/04586

§ 371 (c)(1),
(2), (4) Date: Jan. 4, 2002

(87) PCT Pub. No.: WO01/53684

PCT Pub. Date: Jul. 26, 2001

(65) Prior Publication Data

US 2003/0071145 A1 Apr. 17, 2003

(30) Foreign Application Priority Data

Jan. 22, 2000 (DE) .......................... 100 02 715

(51) Int. Cl.
F02M 59/00 (2006.01)
F02M 39/00 (2006.01)
F02M 47/02 (2006.01)
B05B 1/30 (2006.01)

(52) U.S. Cl. ................ 239/533.2; 239/533.3; 239/585.1; 239/585.3; 239/585.4; 239/585.5; 239/88

(58) Field of Classification Search ............ 239/88, 239/89, 90, 91, 92, 95, 96, 599, 533.2, 533.3, 239/533.9, 585.1–585.5, 597, 5, 601; 29/888.4, 29/890.124, 890.125, 890.131
See application file for complete search history.

(56) References Cited

U.S. PATENT DOCUMENTS

| | | | | |
|---|---|---|---|---|
| 4,360,156 A | * | 11/1982 | Soth et al. .................... 239/11 |
| 4,996,961 A | * | 3/1991 | Usui ......................... 123/456 |
| 5,022,372 A | * | 6/1991 | Imura et al. ................ 123/469 |
| 5,121,730 A | * | 6/1992 | Ausman et al. ............. 123/467 |
| 5,353,992 A | * | 10/1994 | Regueiro ............... 239/533.12 |
| 5,989,076 A | * | 11/1999 | Muzslay .................... 439/736 |

FOREIGN PATENT DOCUMENTS

| | | |
|---|---|---|
| DE | 44 46 071 A | 6/1995 |
| DE | 196 08 575 A | 9/1997 |
| DE | 198 01 491 A | 7/1998 |

* cited by examiner

*Primary Examiner*—Davis Hwu
(74) *Attorney, Agent, or Firm*—Ronald E. Greigg

(57) ABSTRACT

A fuel injection valve having a valve retaining body, which has a longitudinal axis and in which a central spring chamber is embodied. In this spring chamber, a closing spring is disposed, which transmits a closing force to a valve member, which valve member cooperates with a valve seat for controlling at least one injection opening. In the wall of the spring chamber, an inlet conduit extends parallel to the longitudinal axis of the valve retaining body, and by way of this conduit, fuel at high pressure can be delivered to the at least one injection opening. The cross section of the inlet conduit has a greater length in the circumferential direction than in the radial direction, so that the wall region between the inlet conduit and the spring chamber, or the outer jacket face of the valve retaining body, is larger than in the case of an inlet conduit with the same size of cross-sectional area and a circular cross-sectional contour.

7 Claims, 1 Drawing Sheet

FUEL INJECTION VALVE FOR INTERNAL COMBUSTION ENGINES, AND A METHOD FOR PRODUCING SAME

CROSS-REFERENCE TO RELATED APPLICATIONS

This application is a 35 USC 371 application of PCT/DE 00/04586 filed on Dec. 22, 2000.

BACKGROUND OF THE INVENTION

1. Field of the Invention

The invention is based on a fuel injection valve for internal combustion engines.

2. Description of the Prior Art

In one such fuel injection valve, known from German Published, Nonexamined Patent Application DE 196 08 575 A1, a valve body is axially braced against a valve retaining body with a tightening nut, with the interposition of a shim. In the valve body, a bore is embodied, in which a pistonlike valve member is disposed that is axially movable counter to a closing force. On the end of the valve member toward the combustion chamber, a valve sealing face is embodied on the valve member; this face cooperates with a valve seat embodied on the end toward the combustion chamber of the bore, so that the valve member, as a result of an opening stroke motion counter to a closing force, opens at least one injection opening. An inlet bore is embodied in the valve retaining body, shim and valve body, and through this bore fuel at high pressure reaches as far as the valve seat and, when the fuel injection valve is opened, is injected through the injection openings into the combustion chamber of an internal combustion engine.

A hollow chamber is embodied centrally in the valve retaining body, and a prestressed spring is disposed in the hollow chamber. The spring is braced, toward the combustion chamber, on a valve plate joined to the valve member and thus generates the closing force on the valve member. The inlet conduit extends in the wall of the spring chamber and parallel to it. The result, in the known fuel injection valves, is the disadvantage that if the valve retaining body has a slender design, the wall of the inlet conduit must not drop below a certain wall thickness, if it is to be able to withstand the fuel pressure. Hence there is a limit to making the valve retaining body any slenderer or increasing the fuel pressure in the inlet conduit, and with the construction known thus far it has not been possible to go below this limit.

SUMMARY OF THE INVENTION

The fuel injection valve of the invention having the definitive characteristics of claim 1 has the advantage over the prior art that the inlet conduit in cross section has an oval or elliptical shape, and the greatest length, or major axis, points in the circumferential direction of the valve body part. As a result, the wall region between the hollow chamber and the inlet conduit, or between the inlet conduit and the outer wall face of the valve body part, is larger without there being a need to reduce the cross-sectional area of the inlet conduit. As a result, for the same outside dimensions of the valve body part and the same embodiment of the hollow chamber, a higher fuel pressure in the inlet conduit of the valve body part can be achieved. Alternatively, provision can be also made to give the valve body part a slenderer design, and to leave the fuel pressure in the inlet conduit unchanged.

An inlet conduit of oval cross section offers the advantage over a circular cross section that because of the greater wall thickness between the inlet conduit and the hollow chamber, or between the inlet conduit and the outer jacket face of the valve body part, greater tolerance in the manufacture of the valve body part is permissible, without any loss of stability to resist the high fuel pressure in the inlet conduit. As a result, the valve body part can be produced at less effort and thus less expense.

In an advantageous method for producing the fuel injection valve of the invention, a circular bore is made eccentrically in a cylindrical body, which body is solid and preferably is of metal, the bore being parallel to the longitudinal axis of this body. The cylindrical body has an outer diameter that is greater than the desired outer diameter of the valve body part. By plastic deformation of the cylindrical body, the desired outer diameter is achieved while maintaining the cylindrical shape of the outer jacket face; the cross section of the inlet conduit is deformed and assumes an oval or elliptical shape. Only after this method step is the hollow chamber formed, so that the inlet conduit extends within the wall of the hollow chamber. By means of this method it is advantageously possible to produce an inlet conduit of oval or approximately elliptical cross section, without embodying such an inlet conduit directly in the valve body part, such as by drilling or milling, which would be complicated and hence expensive.

BRIEF DESCRIPTION OF THE DRAWINGS

Other features and advantages of the invention will be apparent from the description contained below taken with the drawings, in which.

DESCRIPTION OF THE PREFERRED EMBODIMENT

Figure 1:
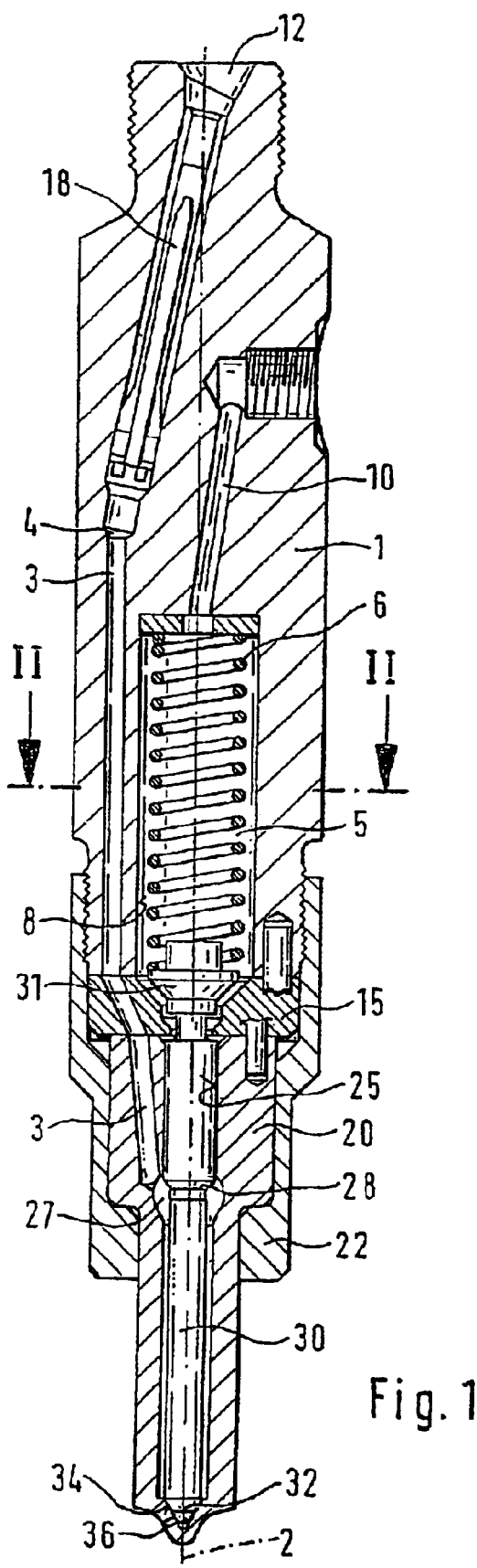
FIG. 1 shows a longitudinal section through a fuel injection valve of the invention.

In FIG. 1, a longitudinal section through a fuel injection valve of the invention is shown. The fuel injection valve has a valve body 20, which is braced with a tightening nut 22, with the interposition of a shim 15, against a valve body part embodied as a valve retaining body 1. In the valve body 20, a bore 25 is embodied as a blind bore, and on its end toward the combustion chamber, there is a substantially conical valve seat 32, in which at least one injection opening 36 is disposed. A pistonlike valve member 30 is disposed in the bore 25; the valve member is guided in the bore 25 in a portion remote from the combustion chamber and narrows, forming a pressure shoulder 28, toward the combustion chamber. On the end toward the combustion chamber of the valve member 30, a substantially conical valve sealing face 34 is formed, which cooperates with the valve seat 32 to control the at least one injection opening 36. The pressure shoulder 28 is disposed in a pressure chamber 27 embodied in the valve body 20, and this pressure chamber continues, in the form of an annular conduit surrounding the valve member 30, as far as the valve seat 32. On the end of the valve member 30 remote from the combustion chamber, the valve member is connected to a spring plate 31, which is disposed in an opening in the shim 15 and protrudes as far as the inside of a central hollow chamber, embodied as a spring chamber 5, in the valve retaining body 1. The spring chamber 5 is embodied as a central bore 8 in the valve retaining body 1 and is disposed at least approximately coaxially to the bore 25. A device embodied as a closing spring 6 is disposed in the spring chamber 5; this closing spring 6 is prestressed and is braced toward the combustion chamber on the spring plate 31 and remote from the combustion chamber on the bottom face, remote from the combustion chamber, of the spring chamber 5. Because of the prestressing of the closing spring 6, a closing force is exerted on the valve member 30, with which the valve member is pressed by the valve sealing face 34 against the valve seat 32. An outlet conduit 10 discharges into the bottom face, remote from the combustion chamber, of the spring chamber 5, and by way of this conduit the leaking oil, flowing out of the pressure chamber 27 past the guided portion of the valve member 30 into the spring chamber 5 can flow away.

The pressure chamber can be filled with fuel at high pressure via an inlet conduit 3 extending within the valve retaining body 1, shim 15 and valve body 20. The end of the inlet conduit 3 opposite the pressure chamber 27 discharges into a high-pressure connection 12, which is disposed on the face end, remote from the combustion chamber, of the valve retaining body 1, approximately in the longitudinal axis 2 of the valve retaining body 1, and which communicates with a high-pressure fuel system, not shown in the drawing. From the high-pressure connection 12, the inlet conduit 3 leads, inclined at an angle to the longitudinal axis 2 of the valve retaining body 1, as far as an intersection 4. From the intersection 4, the inlet conduit 3 extends at least approximately parallel to the longitudinal axis 2 of the valve retaining body 1 in the wall of the spring chamber 5, as far as the shim 15. In the shim 15 and in the valve body 20, the inlet conduit 3 again extends at an incline to the longitudinal axis 2 of the valve retaining body 1 and intersects the pressure chamber 27 at the level of the pressure shoulder 28 of the valve member 30. A fuel filter 18, which filters troublesome particles out of the inflowing fuel, may be provided in the inlet conduit 3 between the high-pressure connection 12 and the kink 4.

Figure 2:
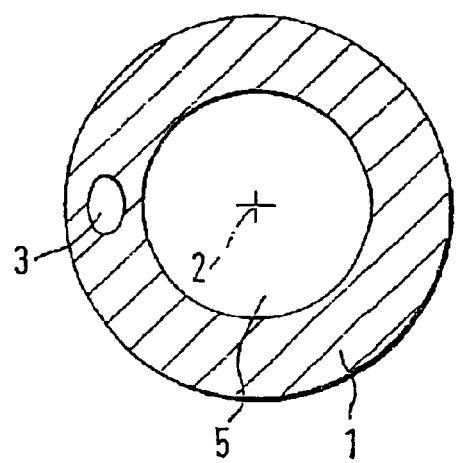
FIG. 2 shows a cross section through the fuel injection valve, shown in FIG. 1, at the level of the spring chamber along the line II—II.

In FIG. 2, a cross section through the fuel injection valve shown in FIG. 1 is shown, at the level of the spring chamber 5. In FIG. 2, the closing spring 6 is not shown, for the sake of simplicity. The inlet conduit 3 in cross section has a greater length in the circumferential direction of the valve retaining body 1 than in the at least approximately radial direction, and for instance as shown in FIG. 2 has an oval, approximately elliptical cross section. As a result, the wall thickness between the inlet conduit 3 and the spring chamber 5, or between the inlet conduit 3 and the outer jacket face of the valve retaining body 1, is embodied as greater than in an inlet conduit 3 of circular cross section and the same size of cross-sectional area. As alternative to the cross section shown in FIG. 2, it can also be provided that the inlet conduit 3 has a different cross-sectional shape. However, the orientation of the inlet conduit 3 is always such that the greatest length of the cross section of the inlet conduit points in the circumferential direction of the valve retaining body 1.

The function of the fuel injection valve is as follows: Via the inlet conduit 3, fuel at high pressure is pumped into the pressure chamber 27. Because of the fuel pressure, a hydraulic force is exerted on the pressure shoulder 28 of the valve member 30. If the component of this hydraulic force acting in the axial direction exceeds the force of the closing spring 6, then the valve member 30 with the valve sealing face 34 lifts up from the valve seat 32, until it comes into contact with a stop face embodied in the shim 15. By this opening stroke motion of the valve member 30, the injection opening 36 is made to communicate with the pressure chamber 27, and fuel is injected into the combustion chamber of the engine. The end of the injection event is initiated by providing that the fuel pressure in the inlet conduit 3, and thus also in the pressure chamber 27, drops. As a result, the hydraulic force on the pressure shoulder 28 of the valve member 30 decreases, until its axial component becomes less than the force of the closing spring 6. The valve member 30 is now accelerated again in the direction of the valve seat 32 by the force of the closing spring 6, until the valve member 30 with the valve sealing face 34 comes to rest on the valve seat 32 and thus closes the injection opening 36.

As an alternative to the closing spring 6 shown in FIG. 1, it can also be provided that the closing force on the valve member 30 is exerted by some other device, such as a hydraulic or magnetic device. It can also be provided that instead of the spring chamber 5, a central opening is embodied, in which a mechanical element is disposed that transmits the closing force to the valve member 30. Furthermore, instead of the valve body 20 shown in the drawing, it is possible to use other suitable valve members, such as valve members that open outward. The inlet conduit 3 of the invention can be realized not only in the fuel injection valve shown but also in any other valve retaining body 1 which has a central hollow chamber and an inlet conduit that extends in the wall of this hollow chamber.

The fuel inlet conduit of the invention can advantageously be produced by the following method. A bore which has a circular cross section is made eccentrically to a cylindrical body, which is solid and preferably comprises metal, the bore being at least approximately parallel to the longitudinal axis of the cylindrical body. The cylindrical body has an outer diameter that is greater than the predetermined value of the valve retaining body 1 to be produced. By mechanical machining, the cylindrical body is then plastically deformed, so that while maintaining its cylindrical shape of the outer jacket face, it is reduced in diameter, until the predetermined value of the valve retaining body 1 to be produced is attained. As a result, the cross section of the inlet conduit 3 changes as well and assumes an oval to elliptical cross-sectional contour. After this deformation, a central hollow chamber forming the spring chamber 5 is embodied in the valve retaining body 1, so that the inlet conduit 3 extends in the wall of the spring chamber 5. After that, all the other characteristics of the valve retaining body 1 can be embodied in a conventional way. The plastic deformation of the cylindrical body is advantageously done by rolling of the cylindrical body, making a permanent plastic reshaping of the cylindrical body possible while maintaining its cylindrical shape of the outer jacket face. As an alternative to rolling, some other suitable deforming method can also be selected. The foregoing relates to preferred exemplary embodiment in the invention, it being understood that other variants and embodiments thereof are possible within the spirit and scope of the invention, the latter being defined by the appended claims.

What is claimed is:

1. A fuel injection valve for internal combustion engines comprising a valve body part (1) having a longitudinal axis and in which a central hollow chamber (5) is embodied, means (6) disposed in said hollow chamber (5) that transmits a force to a valve member (30), and an inlet conduit (3), which extends in the wall of the central hollow chamber (5) parallel to the longitudinal axis (2) of the valve body part (1), and by way of which inlet conduit (3), fuel at high pressure can be delivered to at least one injection opening (36), said inlet conduit (3) in the circumferential direction having a greater length than in an at least approximately radial direction.

2. The fuel injection valve of claim 1, wherein said inlet conduit (3) has an at least approximately oval cross section.

3. The fuel injection valve of claim 2, wherein the two points of the oval cross section located farthest apart from one another in the inlet conduit (3) have at least approximately the same spacing from the longitudinal axis (2) of the valve body (1).

4. The fuel injection valve of claim 2, wherein said oval cross section of the inlet conduit (3) at least approximately forms an ellipse.

5. A method for producing a valve body part (1) of a fuel injection valve of claim 1, comprising the steps of in an at least approximately cylindrical body, a bore forming the inlet conduit (3) is embodied eccentrically and at least approximately parallel to the longitudinal axis (2) of said conduit;

reducing the diameter of the body, while maintaining its at least approximately cylindrical shape, by plastic deformation, until a predetermined diameter is attained, and the cross section of the bore is changed in such a way that the cross section has a greater length in the circumferential direction than in the at least approximately radial direction; and forming the central hollow chamber (5) in the body so that the inlet conduit (3) extends in the wall of the central hollow chamber (5).

6. The method of claim 5, wherein said body forming the valve body part (1) is of metal, preferably steel.

7. The method of claim 6, wherein the steps of plastic deformation of the cylindrical metal body is accomplished by rolling.

* * * * *